United States Patent [19]

Roux

[11] Patent Number: 4,641,858
[45] Date of Patent: Feb. 10, 1987

[54] GASKET INCORPORATING IMPLANTS FOR INTERFITTING PIPES

[75] Inventor: Marius Roux, Caluire, France

[73] Assignee: Societe Anonyme: SABLA, Dardilly, France

[21] Appl. No.: 622,641

[22] Filed: Jun. 20, 1984

[30] Foreign Application Priority Data

Jun. 22, 1983 [FR] France ................................ 83 10614

[51] Int. Cl.⁴ ............................................ F16L 21/00
[52] U.S. Cl. ...................................... 285/94; 285/110; 285/231; 285/345; 285/910; 277/207 A; 277/DIG. 2
[58] Field of Search ................. 285/230, 231, 288, 94, 285/110, 345, 910; 277/207 A, 208, 209, 210, 211, DIG. 2

[56] References Cited

U.S. PATENT DOCUMENTS

| | | | |
|---|---|---|---|
| 2,271,777 | 4/1939 | Nathan | 285/110 |
| 3,386,745 | 6/1968 | Hein | 277/168 |
| 3,520,541 | 7/1970 | Rohani | 277/11 |
| 3,787,061 | 1/1974 | Yoakum | 277/207 A |
| 3,891,224 | 6/1975 | Ditcher | 285/230 |
| 4,299,412 | 11/1981 | Parmann | 285/110 |
| 4,463,955 | 8/1984 | Delhaes | 285/231 |
| 4,572,523 | 2/1986 | Guettouche et al. | 277/DIG. 2 |

FOREIGN PATENT DOCUMENTS

| | | | |
|---|---|---|---|
| 957704 | 1/1957 | Fed. Rep. of Germany . | |
| 2504636 | 10/1982 | France | 277/207 A |
| 890775 | 3/1962 | United Kingdom . | |
| 1031360 | 6/1966 | United Kingdom . | |
| 1041441 | 9/1966 | United Kingdom . | |
| 1218062 | 1/1971 | United Kingdom | 285/230 |
| 2069630 | 8/1981 | United Kingdom | 277/DIG. 2 |

Primary Examiner—Cornelius J. Husar
Assistant Examiner—Anthony Knight
Attorney, Agent, or Firm—Weingarten, Schurgin, Gagnebin & Hayes

[57] ABSTRACT

A gasket for the tight coupling of pipes having an outer face adapted to cooperate with the cylindrical bearing surface of the female end of a pipe, a succession of annular ribs each taking, in cross section, the form of an asymmetrical tooth, two annular housings opening via slots in the inner face and adapted to receive two rigid annular cores, and two mouldings of prismatic cross section and inclined towards the edge of engagement of said gasket in the female end. The invention is more particularly applicable to underground pipes for the circulation of sewage.

14 Claims, 4 Drawing Figures

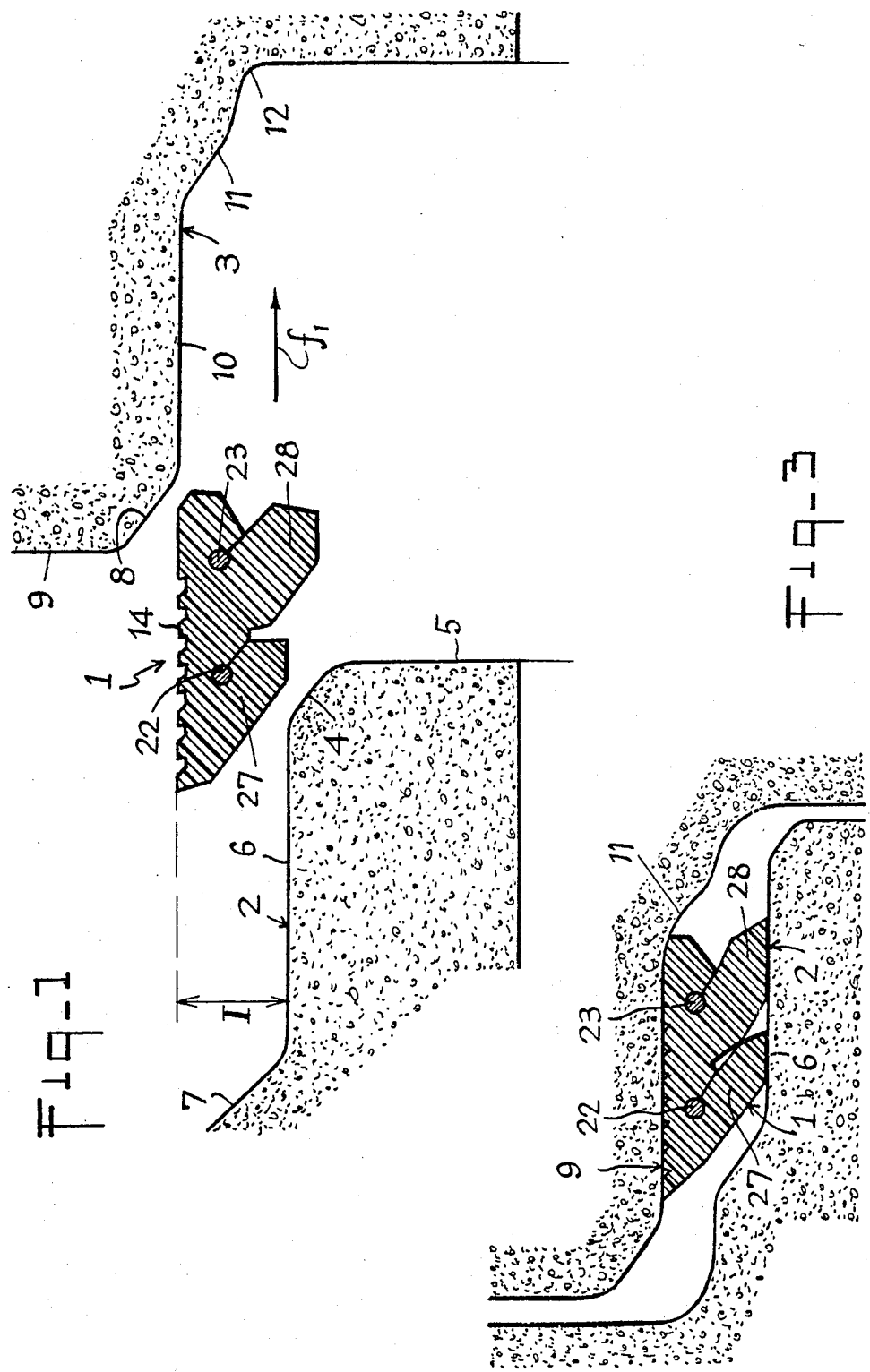

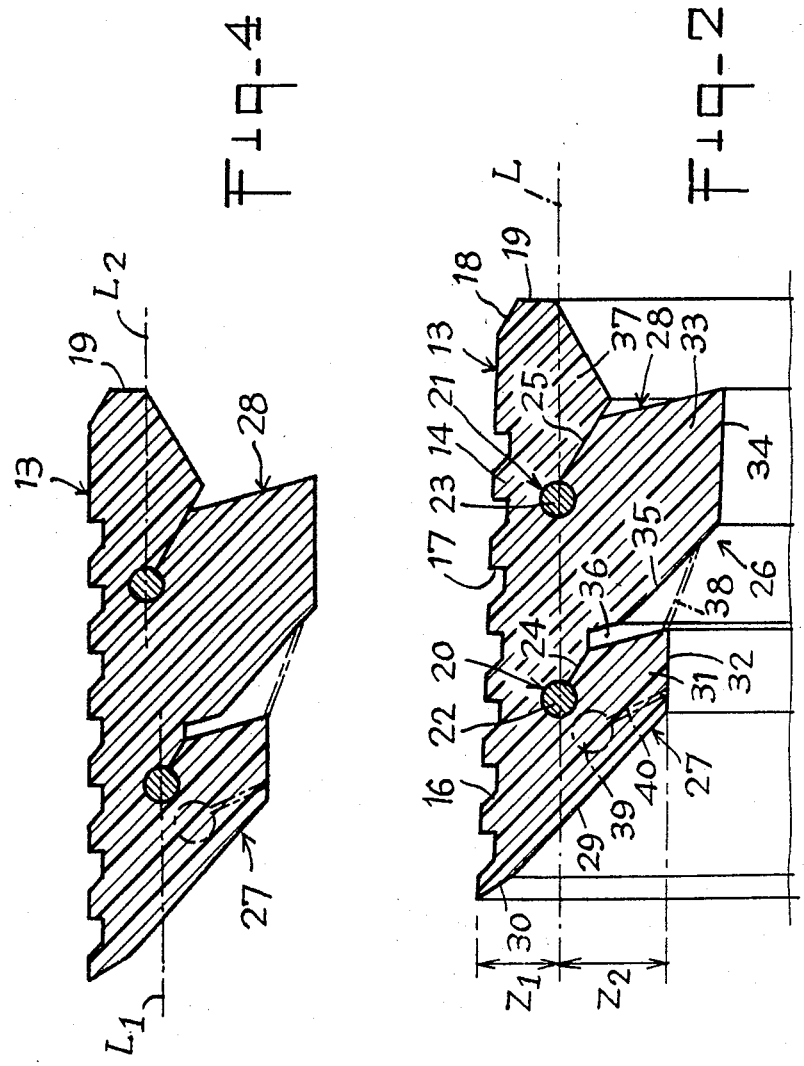

GASKET INCORPORATING IMPLANTS FOR INTERFITTING PIPES

FIELD OF THE INVENTION

The present invention relates to a gasket for interfitting pipes and more particularly to gaskets employed for ensuring the water-tight coupling of pipes comprising, to this end, a neck end and a male end adapted to cooperate with each other.

BACKGROUND OF THE INVENTION

The technical domain in question is more especially that of pipes made of concrete, reinforced or not, intended for making underground flow networks for the circulation of domestic sewage, industrial waste water or rain water.

A major imperative which must be respected when constructing such underground networks resides in the tightness between the ends of the interfitted pipes.

In fact, the joins of the pipes must be perfectly water-tight in order to avoid either pollution of the surrounding ground, in the base of circulation of highly polluted water, or the introduction of water from the ambient medium, of which the additional proportion would be such as to disturb operation of sewage purification or processing stations initially designed to absorb a given volume per unit of time.

To this end, it has therefore been proposed to provide each end of the pipes with a female end in the form of a neck and a male end whose outer diameter is smaller than the inner diameter of the neck end. The inner and outer peripheral surfaces of these ends are shaped so as to allow the intermediate assembly of a gasket generally designed to perform two inherent functions.

The first is to centre the two ends after introduction and the second function is to provide peripheral tightness after coupling.

A third function, generally following therefrom, is that of facilitating penetration of the male end in the neck end, so as to allow appropriate coupling up to the position of maximum introduction defining a state of tight centering of the male end inside the neck end.

It was initially proposed to use a gasket in the form of a toric element, initially placed in a groove defined in the male end or the female end.

It will be appreciated that such a gasket does not offer a capacity of elastic deformation which is sufficient to comply with the first imperative of centering. Consequently, if such a gasket is used, the cylindrical bearing surfaces having to face each other must necessarily be made with precision.

In the particular case of concrete, such a requirement becomes prohibitive due to the technical means that must be employed.

To overcome this drawback, it has been proposed to use gaskets comprising a portion designed to provide relative facility of introduction of the ends and to provide an appropriate tightness, and a local portion adapted to withstand the radial stresses transmitted by the surrounding medium, in order to maintain a centering between the pipes.

The personnel assembling the pipes on site must take particular care with such gaskets. In fact, the pipe ends must be maintained perfectly clean and each gasket must be placed correctly, in the selected direction, so as to allow coupling under suitable conditions and to obtain a water-tight centering of the assembled pipes.

It has been observed that this operation is generally delicate to carry out, in view of the mass of the pipes having to be relatively displaced, and involves particularly well-qualified manpower which is not always available on site.

Furthermore, a fairly large number of gaskets of different shapes are available on the market, and the choice or use of these gaskets must therefore take into account their natural compatibility with the pipes made.

In an attempt to overcome these various drawbacks, certain manufacturers have envisaged immediately incorporating a gasket in the female or neck end, so as to avoid random positioning and to facilitate the personnel's work on site.

To this end, certain propositions envisaged defining a housing in the inner peripheral wall of the neck end, in order to maintain a gasket of appropriate complementary shape therein, under stress. In practice, it has been ascertained that this technique presented three major drawbacks.

The first is that the manufacturer is obliged to purchase gaskets, even for pipes made in an advance manufacturing programme and intended to be stored in a storage yard for a period which is sometimes indefinite. The manufacturer is heavily penalized by this obligation.

The second resides in the fact that a gasket, even placed under stress inside a housing of a female end, undergoes in time an appreciable relaxation of the stress imposed thereon. It is frequently observed that such gaskets no longer properly occupy the housing reserved therefor after a relatively long storage time or even separate therefrom entirely, thus posing a problem of replacement for the assembly teams on site.

The third drawback resides in the necessity to have available specific equipment for making such housings provided in advance. In particular, it is necessary to allow for considerable investment for the purchase of moulding rings having to be positioned on the forms for casting and setting each pipe.

As in certain cases the use of pipes of ordinary shapes must always be envisaged, this obligation imposes two moulding installations on the manufacturer, this considerably increasing the operational costs of a unit for manufacturing such pipes.

Furthermore, another proposition is known, consisting in providing a gasket with an undeformable rigid core, in the form of a ferrule, embedded in a mass of elastically deformable material forming annular mouldings on the outer and inner peripheral faces.

These gaskets undoubtedly provide advantages over the heretofore known solutions, as the rigidity of the core allows positioning in a neck end without risk of untimely displacement.

However, these gaskets present a drawback in that they must be made by moulding, in order to obtain a final product of monolithic structure with a resistant bond between the rigid core and the deformable material.

The obligation of making such gaskets by moulding does not enable particular sections in transverse cross-section to be given to the elastically deformable mouldings or, in other cases, does not enable the undeformable core to be completely coated.

In any case, the gasket thus designed can therefore not be exactly adapted to needs and, in particular, cannot present the faculty of compensation in relation with the manufacturing tolerances which are different between a male end and a female end, taking into account the process for manufacturing a pipe.

SUMMARY OF THE INVENTION

It is an object of the invention to overcome these drawbacks by proposing a novel gasket which may be made equally well by a process of moulding or of extrusion, whilst offering the possibility of forming deformable mouldings having, in transverse cross section, a shape appropriate for the desired objective of centering and of tightness.

Another object of the invention is to propose a novel gasket presenting the feature of offering masses of differential deformability, exactly adapted to the manufacturing tolerances having to be compensated and presented by female and male ends of pipes, particularly made of concrete.

A further object of the invention is to propose a novel gasket adapted to be fitted, with tightening stress, in a neck or female end, either as a function of a more or less long duration of storage or as a function of the nature of the elastically deformable material.

Yet another object of the invention is to propose a novel gasket offering considerably easy mechanized or automatized assembly inside a neck or female end of a pipe, without risk of subsequent untimely displacement, but with the possibility of dismantling when this proves necessary.

A further object of the invention is to propose a novel gasket presenting a reserve of lubricating product which is automatically expelled upon coupling of the pipes, so as to facilitate relative penetration of the male end through the gasket with which the neck or female end of a pipe is fitted.

To attain the above objectives, the gasket according to the invention is characterized in that it is formed by a section of elastically deformable material, of overall thickness greater than the annular gap between the complementary ends of two interfitted pipes, presenting:

- on its outer peripheral face adapted to cooperate with the cylindrical bearing surface of the female end of a pipe, a succession of annular ribs each taking, in transverse cross section, the form of an assymetrical tooth,
- in its radial thickness, two annular housings opening via slots in the inner peripheral face and adapted to receive two rigid annular implants forming stress cores,
- on its inner peripheral face, two mouldings of prismatic transverse cross section and inclined towards the transverse edge of engagement of said gasket in the female end of a pipe.

BRIEF DESCRIPTION OF THE DRAWING

The invention will be more readily understood on reading the following description with reference to the accompanying drawings, in which:

FIG. 1 is a half-section in elevation of the complementary ends of two pipes to be interfitted with positioning of a gasket according to the invention.

FIG. 2 is a transverse section showing, on a larger scale, the structure of the object of the invention.

FIG. 3 is a half-section similar to FIG. 1, but illustrating another characteristic position.

FIG. 4 is a transverse section, similar to FIG. 3, but illustrating a variant embodiment.

DETAILED DESCRIPTION OF THE INVENTION

Referring now to the drawings, the gasket, generally designated by reference 1, is provided to ensure centering and tightness between the male end 2 and the female end 3 of two pipes for constructing underground networks for the circulation of various liquid products. Although the pipes are shown by way of example in the form of products made of concrete, reinforced or not, the gasket is applicable to all pipes of any materials.

The male end 2 conventionally comprises a ramp 4 for connection between the transverse end face 5 and the outer cylindrical bearing surface 6 which joins the pipe body by a ramp 7.

The female or neck end 3 comprises a ramp 8 made between the transverse face 9 and an inner cylindrical bearing surface 10. The end 3 is shaped internally so as to comprise a bearing hump 11 projecting from the stop shoulder 12 constituting the back of the end 3.

The gasket 1 is adapted to be interposed between the cylindrical bearing surfaces 6 and 10, fitted relatively to each other. The gasket 1, illustrated in greater detail in FIG. 2, is made in the form of a section of elastically deformable material which may be obtained by moulding or by extrusion. In such a case, the gasket 1 is constituted from a segment of section cut to the desired length and of which the ends are butt-jointed by any suitable means in order to form a continuous ring. The section is shaped so as to present an overall radial thickness which, in the state of rest, is greater than the radial size of the gap I between the male and female ends 2 and 3, placed concentrically in relative fit.

The section constituting the gasket 1 is made so as to present, in its outer peripheral wall 13, annular ribs 14 which may be formed in projection or be the result of the presence of grooves 15, as may be seen in FIG. 2. The ribs 14 present, in transverse cross section, an asymmetrical form comprising an inclined side 16 to facilitate engagement of the gasket, in the direction of arrow $f_1$, inside the neck end 3. The side 16 is connected, directly or via a flat top, to a sheer face 17. The peripheral surface 13 is connected, by a bevel 18, to the transverse edge 19 for engagement of the gasket inside the neck end.

In the embodiment illustrated in FIG. 2, the outer peripheral face 13 is defined by a truncated envelope of which the small base corresponds to the transverse edge 19.

The section is shaped so as to define in its thickness two annular housings 20 and 21 which are delimited, in the present case, to be located on the same common geometrical locus L centred on the axis of the gasket. The housings 20 and 21 are adapted to contain implants 22 and 23, made of undeformable material, for example constituted by closed toric rings made of steel. According to the invention, these toric rings 22 and 23 have a diameter slightly greater than that of the housings 20 and 21. The presence of the rings 22-23 in the housing causes the elastically deformable material constituting the section, included between the geometrical locus L and the outer peripheral surface 13 to be subjected to a stress in radial expansion. Taking into account the shape of the peripheral surface 13, it is readily appreciated that this expansion develops more strongly at the level of the housing 21 located nearer the edge 19 for engagement.

The housings 20 and 21 open via two slots 24 and 25 on the inner peripheral face 26. The slots allow the implants 22 and 23 to be mounted in the housings 20 and 21. It thus becomes possible to stock gaskets not provided with implants 22 and 23 and which therefore do not undergo permanent stress for the duration of storage.

The section is made so as to comprise, on its inner peripheral face 26, two mouldings 27 and 28 taking a prismatic form in transverse cross section. These mouldings are oriented or inclined in the direction facilitating relative engagement of the gasket on the cylindrical bearing surface 6 of a neck end 2. The first moulding 27 is connected by a slide ramp 29 to the transverse edge 30 of the gasket opposite edge 19. The ramp 29 joins a head 31 of triangular section comprising an annular face 32 centred on the axis of the gasket. The second moulding 28 possesses a section of greater thickness than the first moulding 27 and extends over a radial extent greater than the latter. The moulding 28 has a triangular head 33 which is defined by a face 34 joined by a ramp 35 to a gap or groove 36 separating the two mouldings. The head 33 of the second moulding 28 is connected to an annular heel 37 formed between this moulding and the edge 19.

The section is made so that the slots 24 and 25 extend, in inclined manner, in the direction of the transverse edge 19 from the housings 20 and 21, to open out respectively in the groove 36 and between the moulding 28 and the heel 37.

The positioning of the gasket described hereinabove is effected by introducing it, by the transverse edge 19, inside a neck or female end 3 of a pipe. This engagement is facilitated by the contacting of the bevel 18 with the ramp 8 and also due to the truncated form of the outer peripheral wall 13. This engagement is preferably effected in a completely equipped state, i.e. after assembly of the implants 22 and 23 in the housings 20 and 21.

Axial engagement in the direction of arrow $f_1$ is continued, thus provoking deformation of the ribs 14 which, by reaction to the stress imposed thereon, performs, after engagement, a function of annular anchoring on the bearing surface 10.

This anchoring is also maintained by the action of pre-stress of the mass of elastically deformable material included between the outer peripheral face 13 and the implants 22 and 23 which thus perform a first function of stiffening and of increasing the mechanical holding characteristics of the gasket, as well as a second function of pre-stress of this material.

In this state, the gasket is immobilized and anchored in the cylindrical bearing surface 10 of the female or neck end 3, without risk of untimely displacement, being given that the implants 22 and 23 form an armature which is undeformable radially and on which bear the local stresses of deformation, imposed by the creep of the material constituting the section.

When two pipes are fitted by engagement of the male end 2, the ramp 4 makes contact with the slide ramp 29 and stresses in flexion the first moulding 27 which pivots by bearing against the torus 22. The moulding 27 performs, in this phase, a function of centering of the male end with respect to the female end.

Further penetration of the male end 2 brings ramp 4 in contact with ramp 35, which has for its effect to stress the second moulding 28 in the same direction as the first moulding 27 by bearing on the torus 23. After complete engagement, as shown in FIG. 3, the moulding 28 peripherally grips around the male end 2 and performs a function of seal lip.

In addition to the above advantages, it should be noted that the section is shaped so that the mass of elastically deformable material between the housings 20 and 21 and the peripheral face 13 is less than that between said housings and the surfaces 32 and 34 of the mouldings 27 and 28. In this way, the gasket has two zones $Z_1$ and $Z_2$, with characteristics of differential deformability adapted to match exactly the manufacturing tolerances which, by the process of manufacture employed, are generally lower for the neck or female ends 3 than for the male ends 2.

It is advantageous to use the groove 36, normally reserved for the creep of the material constituting the moulding 27, to contain for the gasket a reserve of lubricating product in the form of paste or the like.

In this way, during introduction or penetration of the male end 2, the deformation imposed on the first moulding 27 drives the lubricating material which is deposited along the ramp 35 to promote slide between the latter and the cylindrical bearing surface 6 of the end 2. FIG. 2 shows that it may be advantageous to provide the section with a lip 38 in line with the surface 32 of the moulding 27. The lip 38 closes the groove 36 and contributes to maintaining, under good conditions of storage, the reserve of lubricating product deposited.

FIG. 2 shows that it may also be provided to shape the section so as to divide the mass constituting the first moulding 27 into two parts delimiting therebetween an annular pocket 39 adapted to be filled with a lubricating product.

In this way, when ramp 29 is brought into contact with ramp 4, the stress applied tends to close the pocket 39, this expelling the lubricating material which spreads over the surface 32 to facilitate introduction and penetration of the male end 2. Pocket 39 may be provided to communicate with a slot 40 opening in the part joining the surface 32 and the ramp 29.

FIG. 4 shows a variant embodiment according to which the peripheral face 13 defines a cylindrical envelope centred on the axis of the gasket. In such a case, the housings 20 and 21 are located on two different circular geometrical lock $L_1$-$L_2$ which are offset relatively to each other, the housing 21 corresponding to the locus of larger diameter, so as to increase the local stress via the implant 23 in a manner similar to what is described in the foregoing embodiment.

It should be observed that the orientation of the slots 24 and 25 is selected to avoid any untimely disengagement of the toric rings 22-23 during penetration of the male end 2. In fact, in this phase, the stress imposed on the mouldings tends to close the slots 24 and 25.

Despite the quality of anchoring resulting from the positioning of the gasket in a female end 3, it should be noted that the structure according to the invention reserves the possibility of withdrawal. In fact, it suffices to subject each slot successively to an opening stress by acting on the mouldings to disengage the toric rings forming armatures. The section may thus be more easily deformed to facilitate extraction thereof without destruction.

The invention is not limited to the examples described and shown, as various modifications may be made thereto without departing from its scope.

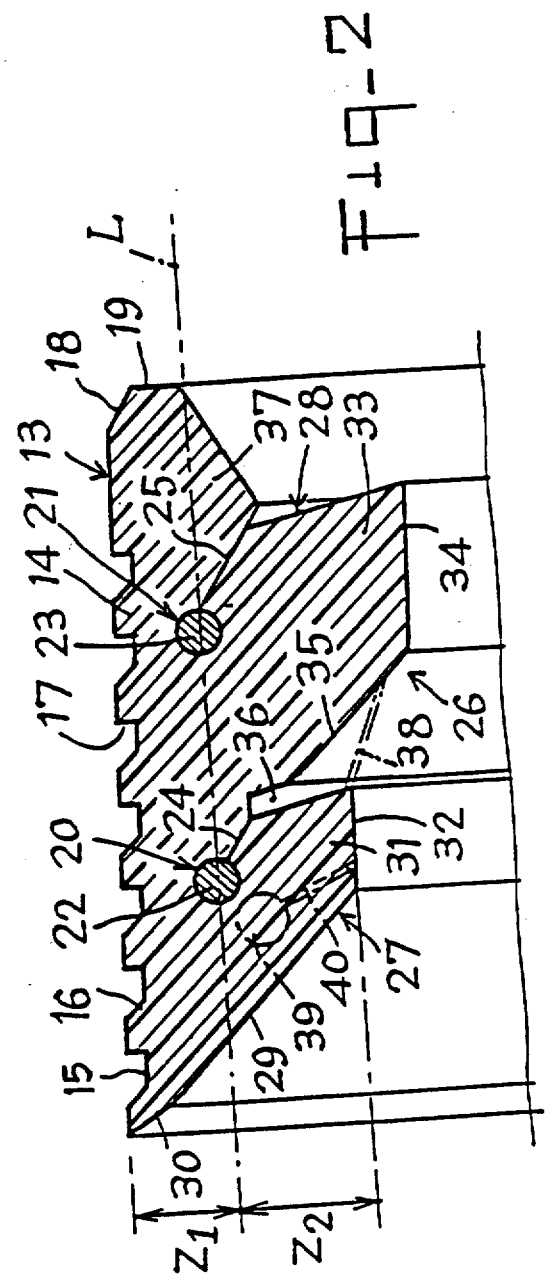

What is claimed is:

1. For use with interfitting pipes having a gap therebetween, a gasket comprising:

an outer peripheral face having a succession of annular ribs each having a cross section in the form of an asymmetrical tooth;

an inner peripheral face having a plurality of mouldings of prismatic cross section;

a first and a second transverse edge joining said outer and inner peripheral faces; and a plurality of rigid annular implants, wherein said prismatic cross section is inclined toward said first transverse edge, and said gasket being made of elastically deformable material and shaped in a cross section having an overall thickness greater than the gap between the ends of the interfitting pipes to be joined, and having a plurality of annular housing openings in its cross section thickness and having access slots from said inner peripheral face to each said annular housing openings, each said annular opening being adapted to receive said rigid annular implants to exert a stress thereon, wherein the annular housing openings have a diameter less than that of the implants prior to the applications of said implants.

2. The gasket according to claim 1 wherein the implants comprise toric closed rings of indeformable material.

3. The gasket according to claim 1 wherein the outer peripheral face joins the first transverse edge by a bevel and comprises ribs each having an inclined face to facilitate engagement in a female end of a pipe and a sheer face.

4. The gasket according to claim 1 comprising a mass of deformable material having a thickness between the annular housing openings and the outer peripheral face, and a mass of deformable material of smaller thickness between said annular housing openings and the inner peripheral face.

5. For use with interfitting pipes having a gap therebetween, a gasket comprising:

an outer peripheral face having a succession of annular ribs each having a cross section in the form of an asymmetrical tooth;

an inner peripheral face having a plurality of mouldings of prismatic cross section;

a first and a second transverse edge joining said outer and inner peripheral faces; and a plurality of rigid annular implants, wherein said prismatic cross section is inclined toward said first transverse edge, and said gasket being made of elastically deformable material and shaped in a cross section having an overall thickness greater than the gap between the ends of the interfitting pipes to be joined, and having a plurality of annular housing openings in its cross section thickness and having access slots from said inner peripheral face to each said annular housing openings, each said annular opening being adapted to receive said rigid annular implants to exert a stress thereon, wherein the annular housing openings occupy a same circular locus centered about the axis of the gasket.

6. The gasket according to claim 5 wherein the inner peripheral face forms a first moulding joining the first transverse edge and a second moulding of smaller section and smaller radial extent than the first moulding, said second moulding being connected to the second transverse edge by a slide ramp.

7. The gasket according to claim 6 wherein the first moulding joins the first transverse edge by a bearing heel.

8. The gasket according to claim 6 wherein the mouldings are separated by a gap or a groove containing a reserve of lubricating product.

9. The gasket according to claim 8 wherein the gap or groove is at least partially covered by a supple lip extending from the second moulding.

10. The gasket according to claim 5 wherein the outer peripheral face defines a truncated envelope centered on the axis of the gasket wherein the small base of said truncate envelope corresponds to the first transverse edge of the gasket.

11. For use with interfitting pipes having a gap therebetween, a gasket comprising:

an outer peripheral face having a succession of annular ribs each having a cross section in the form of an asymmetrical tooth;

an inner peripheral face having a plurality of mouldings of prismatic cross section;

a first and a second transverse edge joining said outer and inner peripheral faces; and a plurality of rigid annular implants, wherein said prismatic cross section is inclined toward said first transverse edge, and said gasket being made of elastically deformable material and shaped in a cross section having an overall thickness greater than the gap between the ends of the interfitting pipes to be joined, and having a plurality of annular housing openings in its cross section thickness and having access slots from said inner peripheral face to each said annular housing openings, each said annular opening being adapted to receive said rigid annular implants to exert a stress thereon, wherein the annular housing openings occupy two circular geometrical loci of different diameters.

12. The gasket according to claim 11 wherein the annular housing opening having the larger diameter is located nearest the first transverse edge.

13. The gasket according to claim 11 wherein the outer peripheral face defines a cylindrical envelope centered on the axis of the gasket.

14. For use with interfitting pipes having a gap therebetween, a gasket comprising:

an outer peripheral face having a succession of annular ribs each having a cross section in the form of an asymmetrical tooth;

an inner peripheral face having a plurality of mouldings of prismatic cross section;

a first and a second transverse edge joining said outer and inner peripheral faces; and a plurality of rigid annular implants, wherein said prismatic cross section is inclined toward said first transverse edge, and said gasket being made of elastically deformable material and shaped in a cross section having an overall thickness greater than the gap between the ends of the interfitting pipes to be joined, and having a plurality of annular housing openings in its cross section thickness and having access slots from said inner peripheral face to each said annular housing openings, each said annular opening being adapted to receive said rigid annular implants to exert a stress thereon, wherein the housings open out respectively in a groove located between the first and second mouldings and between the first moulding and the bearing heel.

* * * * *

UNITED STATES PATENT AND TRADEMARK OFFICE
CERTIFICATE OF CORRECTION

PATENT NO. : 4,641,858
DATED : February 10, 1987
INVENTOR(S) : Marius Roux

It is certified that error appears in the above-identified patent and that said Letters Patent is hereby corrected as shown below:

In the Drawings:

Figure 2 - Reference numeral 15 has been added. See attached new Fig. 2.

Column 1, line 22, "joins of the pipes" should read --joints of the pipes-line 24, "base" should read --case--

Column 2, line 25, "programme" should read --program--

Column 3, lines 47-48, "assymetrical" should read --asymmetrical--

Column 4, line 55, "centred" should read --centered--

Column 5, line 17, "centred" should read --centered--

Signed and Sealed this

Twenty-second Day of November, 1988

Attest:

DONALD J. QUIGG

Attesting Officer     Commissioner of Patents and Trademarks